(12) United States Patent
Yamada et al.

(10) Patent No.: US 7,755,252 B2
(45) Date of Patent: Jul. 13, 2010

(54) DRIVING DEVICE HAVING SUITABLE STATIONARY MEMBER AS MATERIAL

(75) Inventors: Tsukasa Yamada, Kanagawa (JP);
Toyoki Tanaka, Kanagawa (JP);
Takahiko Nishiyama, Kanagawa (JP);
Soumei Takahashi, Tokyo (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 69 days.

(21) Appl. No.: 12/148,252

(22) Filed: Apr. 17, 2008

(65) Prior Publication Data

US 2008/0257083 A1  Oct. 23, 2008

(30) Foreign Application Priority Data

Apr. 18, 2007  (JP) .............................. 2007-109005

(51) Int. Cl.
*H01L 41/08* (2006.01)
(52) U.S. Cl. .............................. 310/323.02; 310/323.01
(58) Field of Classification Search ................................. 310/323.01–323.03
See application file for complete search history.

(56) References Cited

U.S. PATENT DOCUMENTS

| | | | |
|---|---|---|---|
| 3,941,903 A | 3/1976 | Tucker | |
| 4,786,836 A | 11/1988 | Tokushima | |
| 4,830,500 A | 5/1989 | Kuroki et al. | |
| 5,225,941 A * | 7/1993 | Saito et al. | 359/824 |
| 5,442,166 A | 8/1995 | Hollmann | |
| 5,589,723 A | 12/1996 | Yoshida et al. | |
| 5,821,441 A | 10/1998 | Kawamura | |
| 5,890,391 A | 4/1999 | Okada | |
| 6,084,363 A | 7/2000 | Mizumoto | |
| 6,111,336 A | 8/2000 | Yoshida et al. | |

(Continued)

FOREIGN PATENT DOCUMENTS

DE  36 37 930 A  4/1992

(Continued)

OTHER PUBLICATIONS

Extended European Search Report dated Sep. 1, 2009 (8 pages), issued in European Application Serial No. 08154734.1 (which is a counterpart of related U.S. Appl. No. 12/082,948).

(Continued)

*Primary Examiner*—J. SanMartin
(74) *Attorney, Agent, or Firm*—Frishauf, Holtz, Goodman & Chick, P.C.

(57) ABSTRACT

A driving device includes an electro-mechanical transducer having first and second end portions opposite to each other in an expansion/contraction direction, a stationary member coupled to the first end portion of the electro-mechanical transducer, a vibration friction portion mounted to the second end portion of the electro-mechanical transducer, and a rod-shaped moving portion frictionally coupled to the vibration friction portion, whereby moving the moving portion in the expansion/contraction direction of the electro-mechanical transducer. The stationary member consists essentially of a base alloy which consists of, by weight, 88 to 97% tungsten, 2 to 11% nickel as a binder, and, as the balance, 0.1 to 2% at least one metal having an ionization tendency which is higher than that of tungsten. The stationary member has a surface without nickel plating.

6 Claims, 8 Drawing Sheets

U.S. PATENT DOCUMENTS

| | | | |
|---|---|---|---|
| 6,114,799 | A | 9/2000 | Yoshida et al. |
| 6,140,750 | A | 10/2000 | Ueyama |
| 6,188,161 | B1 | 2/2001 | Yoshida et al. |
| 6,232,697 | B1 | 5/2001 | Mizumoto |
| 6,392,827 | B1 | 5/2002 | Ueyama et al. |
| 6,492,637 | B1 | 12/2002 | Fujita |
| 6,528,926 | B2 * | 3/2003 | Okamoto et al. ........ 310/323.17 |
| 6,856,072 | B2 | 2/2005 | Kosaka et al. |
| 7,157,830 | B2 | 1/2007 | Jansson et al. |
| 7,173,363 | B2 | 2/2007 | Hendriks et al. |
| 7,199,506 | B2 | 4/2007 | Sasaki et al. |
| 7,271,522 | B2 | 9/2007 | Yuasa et al. |
| 7,342,347 | B2 | 3/2008 | Magnussen et al. |
| 7,355,325 | B2 | 4/2008 | Johansson et al. |
| 7,355,802 | B2 | 4/2008 | Homme |
| 7,368,854 | B2 | 5/2008 | Manabe |
| 7,433,138 | B2 * | 10/2008 | Sasaki ......................... 359/824 |
| 7,446,949 | B2 * | 11/2008 | Manabe et al. .............. 359/696 |
| 7,531,941 | B2 * | 5/2009 | Manabe ................. 310/323.02 |
| 2002/0038988 | A1 | 4/2002 | Matsuo et al. |
| 2002/0109434 | A1 | 8/2002 | Seki |
| 2004/0000903 | A1 | 1/2004 | Morimoto |
| 2004/0216589 | A1 | 11/2004 | Amick |
| 2005/0127789 | A1 | 6/2005 | Magnussen et al. |
| 2005/0242688 | A1 * | 11/2005 | Yuasa et al. ................. 310/328 |
| 2005/0275315 | A1 | 12/2005 | Manabe et al. |
| 2006/0103266 | A1 | 5/2006 | Okamoto |
| 2006/0238075 | A1 | 10/2006 | Manabe et al. |
| 2007/0036533 | A1 | 2/2007 | Sasaki |
| 2007/0036534 | A1 | 2/2007 | Sasaki et al. |
| 2007/0075610 | A1 * | 4/2007 | Manabe et al. .............. 310/348 |
| 2007/0096601 | A1 | 5/2007 | Sueyoshi et al. |
| 2008/0196815 | A1 * | 8/2008 | Yamada et al. ................ 156/60 |
| 2009/0027785 | A1 * | 1/2009 | Tanaka et al. ............... 359/824 |
| 2009/0146602 | A1 | 6/2009 | Kikuchi et al. |

FOREIGN PATENT DOCUMENTS

| | | |
|---|---|---|
| EP | 1 605 290 A2 | 12/2005 |
| EP | 1 755 176 A2 | 2/2007 |
| EP | 1 845 607 A | 10/2007 |
| JP | 6-174999 A | 6/1994 |
| JP | 7-49442 A | 2/1995 |
| JP | 2633066 B2 | 4/1997 |
| JP | 9-191665 A | 7/1997 |
| JP | 10-023771 A | 1/1998 |
| JP | 10-337057 A | 12/1998 |
| JP | 3002890 B2 | 11/1999 |
| JP | 3141714 B2 | 12/2000 |
| JP | 3171000 B2 | 3/2001 |
| JP | 3180557 B2 | 4/2001 |
| JP | 3212225 B2 | 7/2001 |
| JP | 3218851 B2 | 8/2001 |
| JP | 3212225 B2 * | 9/2001 |
| JP | 2003-185406 A | 7/2003 |
| JP | 2005-218244 A | 8/2005 |
| JP | 2006-5998 A | 1/2006 |
| JP | 2006-54979 A | 2/2006 |
| JP | 2006-113155 A | 4/2006 |
| JP | 2006-113874 A | 4/2006 |
| JP | 2006-304529 A | 11/2006 |
| WO | WO 2006/059459 A | 6/2006 |

OTHER PUBLICATIONS

Notice of Allowance dated Aug. 11, 2009, issued in related U.S. Appl. No. 12/082,939.

Notice of Allowance dated Aug. 7, 2009, issued in related U.S. Appl. No. 12/082,948.

Office Action dated Mar. 12, 2009, issued in related U.S. Appl. No. 12/082,947.

Office Action dated May 14, 2009, issued in related U.S. Appl. No. 12/148,793.

U.S. Appl. No. 12/082,939, filed Apr. 15, 2008, Entitled "Driving Device Capable of Obtaining a Stable Frequency Characteristic" Inventor: Takahashi et al.

U.S. Appl. No. 12/082,947, filed Apr. 15, 2008, Entitled "Driving Device Capable of Improving a Shock and Vibration Resistance Thereof" Inventor: Nishiyama et al.

U.S. Appl. No. 12/082,948, filed Apr. 15, 2008, Entitled "Driving Device Capable of Transferring Vibrations Generated by an Electro-Mechanical Transducer to a Vibration Friction Portion with a High Degree of Efficiency" Inventor: Yamada et al.

U.S. Appl. No. 12/148,257, filed Apr. 17, 2008, Entitled "Driving Device Capable of Reducing Height Thereof" Inventor: Yamada et al.

U.S. Appl. No. 12/148,253, filed Apr. 17, 2008, Entitled "Method of Driving a Driving Device" Inventor: Tanaka et al.

U.S. Appl. No. 12/148,793, filed Apr. 22, 2008, Entitled "Position Detecting Device Capable of Improving Detection Accuracy" Inventor: Tanaka et al.

Extended European Search Report dated Sep. 9, 2008 issued in European Application No. 08154985.9-2213 (which is a counterpart of related U.S. Appl. No. 12/148,793).

Extended European Search Report and Written Opinion dated Sep. 4, 2009 issued in a counterpart European application No. 08 15 4797 of related U.S. Appl. No. 12/148,253. (6 pages).

Extended European Search Report and Written Opinion dated Aug. 31, 2009 issued in a counterpart European application No. 08 15 4485 of related U.S. Appl. No. 12/082,947. (8 pages).

Extended European Search Report and Written Opinion dated Sep. 3, 2009 issued in a counterpart European application No. 08 15 4774. (9 pages).

Extended European Search Report dated Nov. 4, 2009 issued in counterpart European Appln. No. 08154796.0 of related U.S. Appl. No. 10/148,257.

* cited by examiner

DRIVING DEVICE HAVING SUITABLE STATIONARY MEMBER AS MATERIAL

This application is based upon and claims the benefit of priority from Japanese Patent Application JP 2007-109005, filed on Apr. 18, 2007, the disclosure of which is incorporated herein in its entirety by reference.

BACKGROUND OF THE INVENTION

This invention relates to a driving device (a linear actuator) and, in particular, to a driving device where an electro-mechanical transducer such a piezoelectric element is used as a driving source of the driving device (the linear actuator).

Previously, linear actuators (driving devices) using electro-mechanical transducers such as piezoelectric elements, electrostrictive elements, magnetostrictive elements, or the like are used as auto-focus actuators or zoom actuators for use in cameras.

By way of illustration, Japanese Patent No. 2633066 (JP-B 2633066) (which will be also called a first patent document), which corresponds to U.S. Pat. No. 5,225,941, discloses a driving device comprising a driving rod frictionally engaged with a lens barrel, a piezoelectric element disposed in contact with the driving rod, and a leaf spring for bringing the driving rod into frictional engagement with the lens barrel. That is, the driving rod is bonded to an end of the piezoelectric element in an expansion direction. The lens barrel is movably supported to the driving rod. The leaf spring produces friction between the driving rod and the lens barrel. In the driving device disclosed in JP-B 2633066, a voltage is applied to the piezoelectric element so as to make a speed of expansion of the piezoelectric element different from a speed of contraction thereof.

In addition, Japanese Patent No. 3218851 (JP-B 3218851) (which will be also called a second patent document), which corresponds to U.S. Pat. No. 5,589,723, discloses a driving apparatus comprising a piezoelectric element, a driving member (a driving shaft), coupled to the piezoelectric element, for extending in an expansion direction of the piezoelectric element, and a driven member (a moving member, a lens barrel) having a friction member frictionally coupled to the driving member (the driving shaft). The driving apparatus in JP-B 3218851 drives the lens barrel by devising a driving signal applied to the piezoelectric element Japanese Patent No. 3180557 (JP-B 3180557) (which will be also called a third patent document), which corresponds also to U.S. Pat. No. 5,589,723, discloses a driving apparatus including the friction member composed of a metal and the driving member made of a fiber-reinforced resin composite.

Japanese Unexamined Patent Application Publication No. 2006-54979 (JP-A 2006-54979) (which will be also called a fourth patent document) discloses an actuator which is capable of moving a driven member with stability and with precision. The actuator disclosed in JP-A 2006-54979 comprises a first piezoelectric element, a diving member mounted to the first piezoelectric element, a driven member which is frictionally coupled to the driving member and which extends in a driving direction, and a second piezoelectric element for engaging the driving member with the driven member and for releasing a friction engagement between the driving member and the driven member. Specifically, the actuator disclosed in JP-A 2006-54979 comprises a pair of first piezoelectric elements for driving, a second piezoelectric element for engagement, a pair of driving members, and a pressure spring. The pair of first piezoelectric elements and the pair of driving members are disposed at both sides with the driven member sandwiched between them. The pair of driving members have a distance which is expanded or narrowed by the second piezoelectric element. By the second piezoelectric element, the friction engagement between the pair of the driving members and the driven member is ensured or released.

Japanese Unexamined Patent Application Publication N. H9-191665 (JP-A 9-191665) (which will be also called a fifth patent document), which corresponds to U.S. Pat. No. 5,890,391, discloses a linear drive mechanism using an electro-mechanical conversion element which is insensitive to elastic deformation of a constituent member. The linear driving mechanism disclosed in JP-A 9-191665 comprises the electro-mechanical conversion element, a working member which is fixedly connected to the electro-mechanical conversion element and which displaces with the electro-mechanical conversion element, a driving member frictionally coupled to the working member, a driven member coupled to the driving member, and a driving pulse generating arrangement for causing expansion/contraction displacement to the electro-mechanical conversion element. In JP-A 9-191665, an internal barrel is integratedly and fixedly attached to a fixed lens barrel. The internal barrel has extensions which are formed in a radial direction on part of the internal barrel. A drive shaft (a moving portion) arranged parallel to an optical axis is supported by bearings of the extensions so as to be movable in the optical axis direction. A piezoelectric element (the electro-mechanical conversion element) is disposed between the working member (a vibration friction portion) and the extension of the internal barrel. The top half of the working member touches the drive shaft and a pad is installed on the bottom half of the working member and exerts a force toward the drive shaft via a spring, such that the pad touches the bottom half of the working member. The working member and the pad are friction-bonded to the drive shaft via a suitable friction force. By generating expansion/compression displacements having different rates in the thickness direction of the piezoelectric element, the working member is displaced, and the drive shaft is driven by friction contact with the working member together with a lens holding frame serving as the driven member.

On the other hand, Japanese Unexamined Patent Application Publication No. 2005-218244 (JP-A 2005-218244) (which will be also called a sixth patent document) discloses a fixed member (a weight, a stationary member) which is bonded to one end of an electro-mechanical transducer. The weight disclosed in JP-A 2005-218244 consists essentially of a base alloy which consists of, by weight, 95 to 97.5% tungsten and, as the balance, a binder including one or two of copper and nickel. The base alloy has a surface coated with a nickel plating layer.

In addition, Japanese Patent No. 3212225 (JP-B 3212225) (which will be also called a seventh patent document) discloses a vibrator for a compact vibration generating device such as a vibrator for a compact pager. The vibrator disclosed in JP-B 3212225 has a composition consisting essentially of, by weight, 85-98% tungsten (W), 1.0-12.0% nickel (Ni), 0.1-2.0% molybdenum (Mo), 0-1.0% iron (Fe), and incidental impurities, and which is not subjected to heat treatment after sintering.

There are problems in the above-mentioned first through forth patent documents as follows.

In the driving device disclosed in the first patent document, inasmuch as the lens holder (the driven member, the moving portion) is movably supported to the guide bar (the driving member, the vibration friction portion) bonded to the piezo-electric element, the guide bar (the driving member, the vibration friction portion) has a length longer than that of the lens holder (the driven member, the moving portion) and the guide bar (the driving member, the vibration portion) is easy to produce an inclination caused by a reciprocating motion. In addition, the longer a moving distance of the lens holder (the driven member, the moving portion), the longer the guide bar (the driving member, the vibration friction member) and it results in easily producing an unnecessary vibration mode. Furthermore, inasmuch as the friction engagement portion lies on an extension of a coupling portion between the piezoelectric element and the guide bar (the driving member, the vibration friction member), it counts against a reduction in profile thereof.

In also the driving apparatus disclosed in the second patent document, inasmuch as the driving shaft (the driving member, the vibration friction portion) extends in an expansion/contraction direction of the electro-mechanical transducer, the driving shaft (the driving member, the vibration friction portion) has a length longer than that of the a zoom lens barrel (the driven member, the moving portion) and the driving shaft (the driving member, the vibration friction portion) is easy to produce an inclination caused by a reciprocating motion. In addition, the longer a moving distance of the zoom lens barrel (the driven member, the moving portion), the longer the driving shaft (the driving member, the vibration friction portion) and it results in easily producing an unnecessary vibration mode. Furthermore, inasmuch as the friction engagement portion lies on an extension of a coupling portion between the electro-mechanical transducer and the driving shaft (the driving, member, the vibration friction member), it counts against a reduction in profile thereof. In addition, inasmuch as the driving apparatus has structure where the zoom lens barrel (the driven member, the moving portion) is cantilevered by the driving shaft (the driving member, the vibration friction portion), it is impossible to mechanically move a large weight object such as the lens.

The third patent document may just disclose the driving apparatus where the driving shaft (the driving member, the vibration friction portion) is made of the fiber-reinforced resin composite and has a basic structure which is similar to that illustrated in the second patent document. It has therefore disadvantage which is similar to that of the second patent document.

Although the driving member (the vibration friction portion) has a length which is shorter than that of the driven member (the moving portion) in the actuator disclosed in the fourth patent document, the actuator disclosed in the fourth patent document is disadvantageous in that it is complicated in structure and it is impossible to reduce a size thereof because it comprises a plurality of piezoelectric elements.

On the other hand, the fifth patent document discloses the linear drive mechanism where the moving member (the moving portion) has a rod shape and the working member (a vibration friction portion) has a complicated shape. However, the fifth patent document neither discloses nor teaches a material of the Internal barrel (the stationary member, the fixed member, the weight).

In the sixth patent document, inasmuch as the weight contains copper which is an ionization tendency which is lower than that of tungsten, tungsten itself easily undergoes oxidation and it is necessary to apply a nickel coating for preventing oxidation of tungsten to a surface of a tungsten alloy. As a result, it is disadvantageous in that a manufacturing process increases and a piece rate of the weight (the stationary member, the fixed member) is expensive. Oxidation of tungsten results in generating dust and it prevents the moving portion driving. In addition, inasmuch as the dust deposits on the lens and on the image pickup device, the dust becomes a cause of image degradation. Therefore, anti-oxidation measures are absolutely necessary in the sixth patent document.

Although the seventh patent document discloses the tungsten alloy (sintered compact) which is highly resistant to corrosion, a use thereof is the vibrator for the compact pager. The seventh patent document neither discloses nor teaches whether or not the tungsten alloy is applicable to the stationary member (the weight, the fixed member) of the driving device for which the present invention is intended.

In addition, any of the first through the seventh patent documents does not make the consideration of efficient transfer of vibrations of the electro-mechanical transducer to the vibration friction portion.

SUMMARY OF THE INVENTION

It is therefore an exemplary object of the present invention to provide a driving device comprising a stationary member which is suitable for a material.

It is another exemplary object of the present invention to provide a driving device comprising a stationary member which is capable of improving the corrosion resistance thereof.

It is still another exemplary object of the present invention to provide a driving device which is capable of efficiently transferring vibrations of an electro-mechanical transducer to a vibration friction portion.

Other objects of this invention will become clear as the description proceeds.

On describing the gist of an exemplary aspect of this invention, it is possible to be understood that a driving device includes an electro-mechanical transducer having first and second end portions opposite to each other in an expansion/contraction direction, a static member coupled to the first end portion of the electro-mechanical transducer, a vibration friction portion mounted to the second end portion of the electro-mechanical transducer, and a rod-shaped moving portion frictionally coupled to the vibration friction portion. The rod-shaped moving portion is movable in the expansion/contraction direction of the electro-mechanical transducer. According to the exemplary aspect of this invention, the stationary member consists essentially of a base alloy which consists of, by weight, 88 to 97% tungsten, 2 to 11% nickel as a binder, and, as the balance, 0.1 to 2% at least one metal having an ionization tendency which is higher than that of tungsten. The stationary member has a surface without nickel plating.

By making the stationary member the above-mentioned composition, the stationary member has a specific gravity of 18.8 at the maximum and 17.9 at the minimum, and it is possible to contain a difference between the specific gravities within 5%. Inasmuch as the more a content of tungsten, the stationary member (the weight) can be downsized, design flexibility expands. Conversely, the more a content of nickel, the higher corrosion resistance. By freely changing a composition ratio within a range of the above-mentioned composition, it is possible to select the composition having good balance between the design flexibility and the corrosion resistance.

Herein, the reason that the tungsten content of the stationary member is, in weight percent, 88 to 97% is as follows. That is, if the tungsten content of the stationary member 442 is, in weight percent, less than 88%, the specific gravity of the stationary member becomes too small. On the other hand, if the tungsten content of the stationary member is, in weight percent, more than 97%, the binder content of the stationary member becomes too small so that metal powder does not solidify and it is impossible to sinter the metal powder.

On the other hand, the reason that the nickel content of the stationary member is, in weight percent, 2 to 11% is as follows. That is, if the nickel content of the stationary member is, in weight percent, less than 2%, to corrosion resistance of the stationary member is sharply poor. On the other hand, if the nickel content of the stationary member is, in weight percent, more than 11%, the tungsten content of the stationary member relatively decreases and the specific gravity of the stationary member becomes small.

In addition, the reason whey at least one metal having an ionization tendency which is higher than that of tungsten is doped in the tungsten alloy as the balance is for enhancing a density of sintered metal. The reason that the balance content of the stationary member is, in weight percent, 0.1 to 2% is as follows. That is, if the balance content of the stationary member is, weight percent, less than 0.1%, it is disadvantageous in that it is impossible to enhance the density of the sintered metal. On the other hand, if the balance content of the stationary member is, in weight percent, more than 2%, molded metal has increased hardness and it results in shorting a life of a die.

DESCRIPTION OF THE PREFERRED EMBODIMENTS

Figure 1:
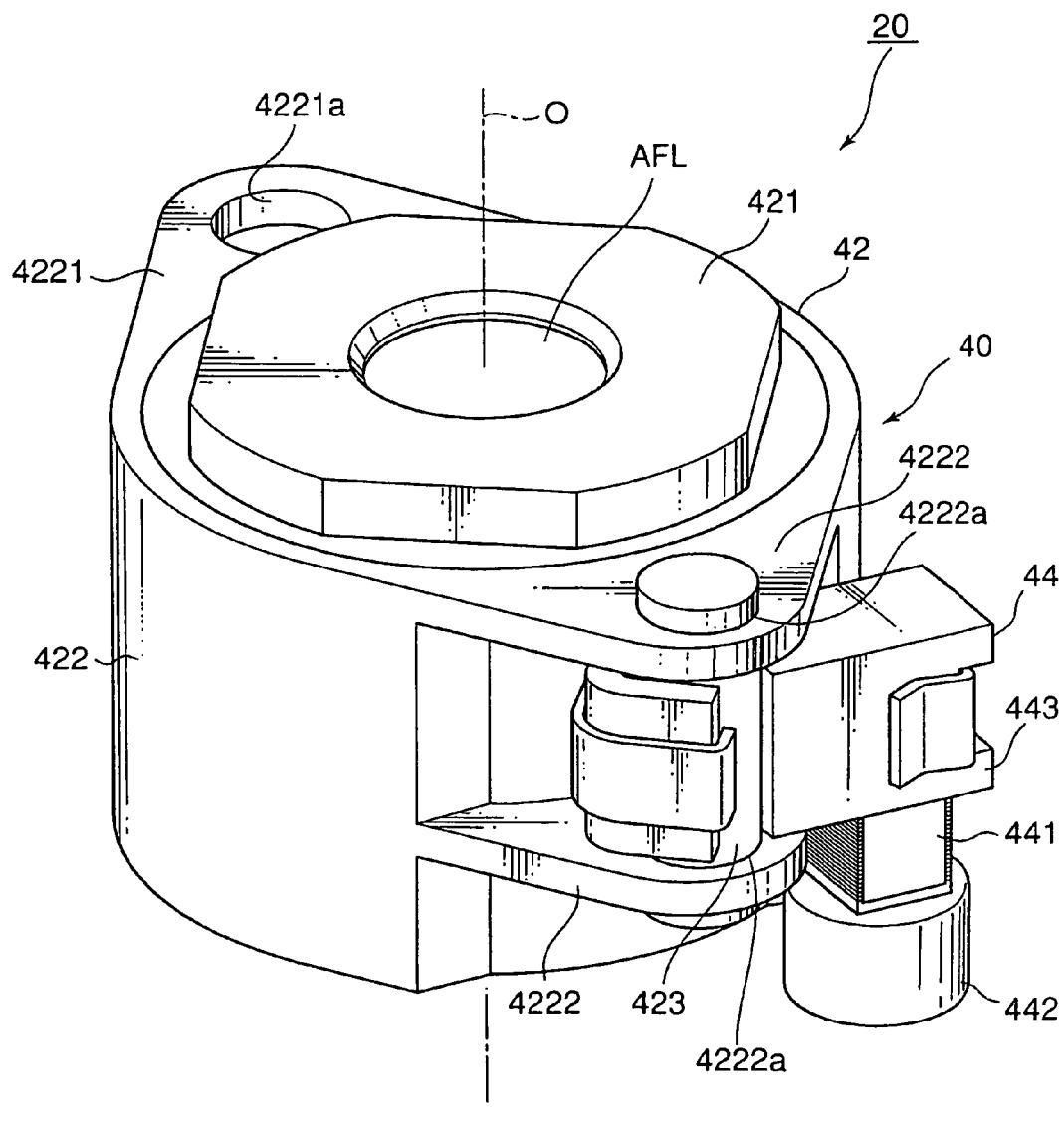
FIG. 1 is an external perspective view showing a driving device according to an exemplary embodiment of this invention.
Figure 1:
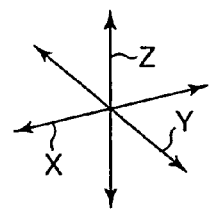

FIG. 1 is an external perspective view of a driving device 20 according to an exemplary embodiment of this invention. Herein, in the manner shown in FIG. 1, an orthogonal coordinate system (X, Y, Z) is used. In a state illustrated in FIG. 1, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being Illustrated in FIG. 1, the up-and-down direction Z is a direction of an optical axis O of a lens.

The driving device 20 is covered with a cabinet (not shown). The cabinet includes a cap-shaped upper cover (not shown) and a lower base (not shown). On the lower base of the cabinet, a stationary member (a weight) 442 which will later be described is mounted. The upper cover has an upper surface comprising a cylinder portion (not shown) having a center axis which is the optical axis O.

On the other hand, although illustration is not made, the lower base had a central portion in which an image pickup device disposed on a substrate is mounted. The image pickup device picks up a subject image formed by an movable lens (which will later be described) to convert it into an electric signal. The image pickup device may, for example, comprise a CCD (charge coupled device) type-image sensor, a CMOS (complementary metal oxide semiconductor) type image sensor, or the like.

The illustrated driving device 20 comprises an auto-focus lens driving unit 40.

In the cabinet, a guide shaft (not shown) is disposed at a left and back side. The guide shaft extends in parallel with the optical axis O. The guide shaft has an upper end which is fixed to the upper surface of the upper cover of the cabinet and a lower end which is fixed to the lower base of the cabinet. With the optical axis O sandwiched, a rod-shaped moving portion (a movable shaft) 423, which will later be described, is disposed at a right and front side which is opposite side with respect to the guide shaft. That is, the guide shaft and the moving shaft 423 are disposed at positions which are rotationally symmetric about the optical axis O.

The auto-focus lens driving unit 40 comprises a lens movable portion 42 and a lens driving portion 44. The lens movable portion 42 includes a lens holding frame 421 for holding an auto-focus lens AFL which is the movable lens. The lens holding frame 421 is fixed on an upper portion of a movable barrel 422 having a substantially cylindrical shape. The movable barrel 422 comprises a pair of extending portions (however, an upper side thereof is only illustrated in FIG. 1) 4221 which extend in a radial direction outwards at the left and back side. The pair of extending portions 4221 have through holes 4221a through which the above-mentioned guide shaft passes. In addition, the movable barrel 422 comprises a pair of extending portions 4222 which extend in the radial direction outwards at the right and front side. The pair of extending portions 4222 have fitting holes 4222a through which the rod-shaped movable shaft 423 passes and to which the rod-shaped moving shaft 423 is fixed. With this structure, the lens movable portion 42 is movable in the direction of the optical axis O with respect to the cabinet.

The lens driving portion 44 slidably supports the lens movable portion 42 in the direction of the optical axis O and drives the lens movable portion 42 in the manner which will later be described.

Figure 2:
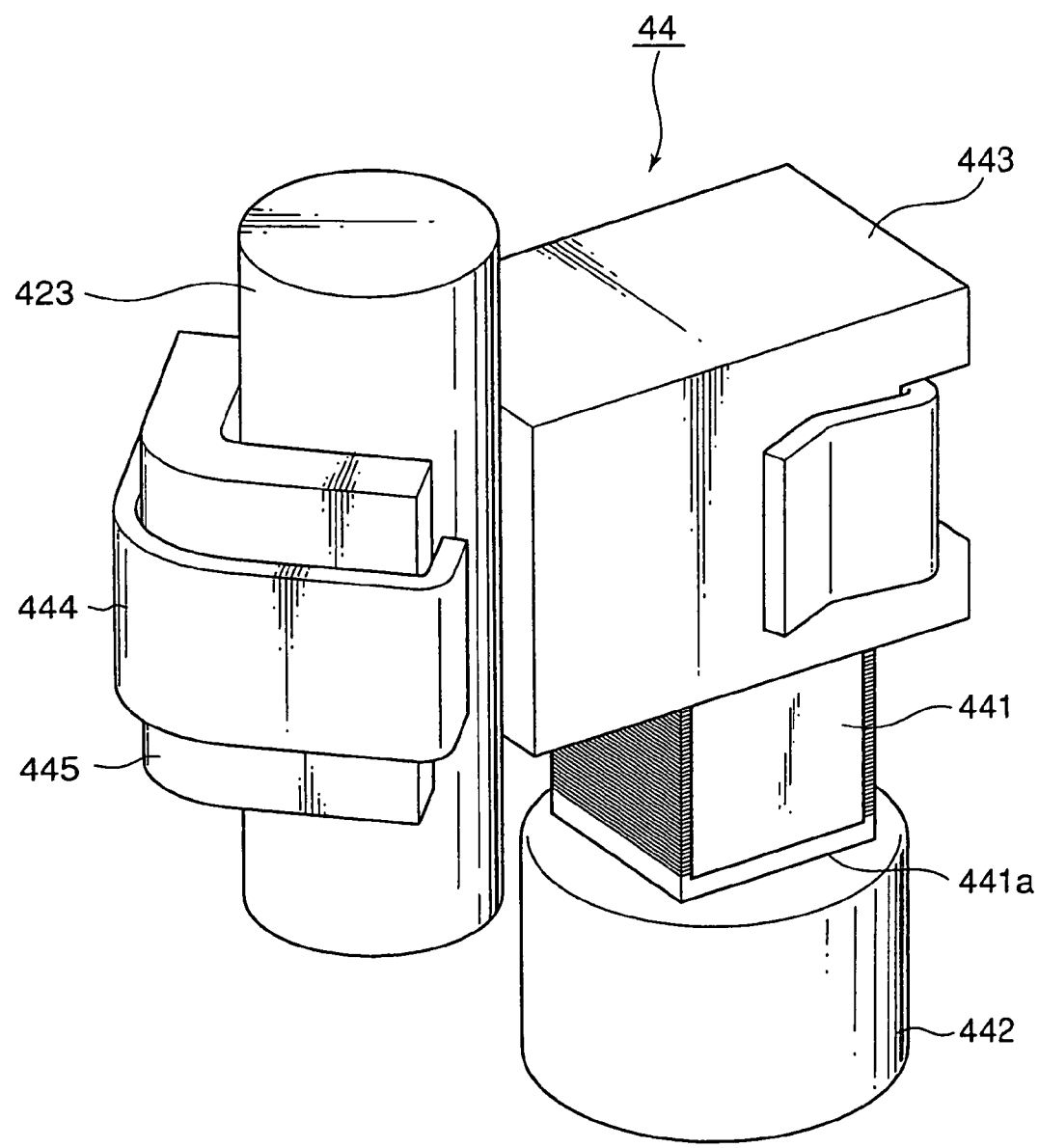
FIG. 2 is a perspective view showing a lens driving portion of the driving device illustrated in FIG. 1 together with a rod-shaped moving shaft.
Figure 3:
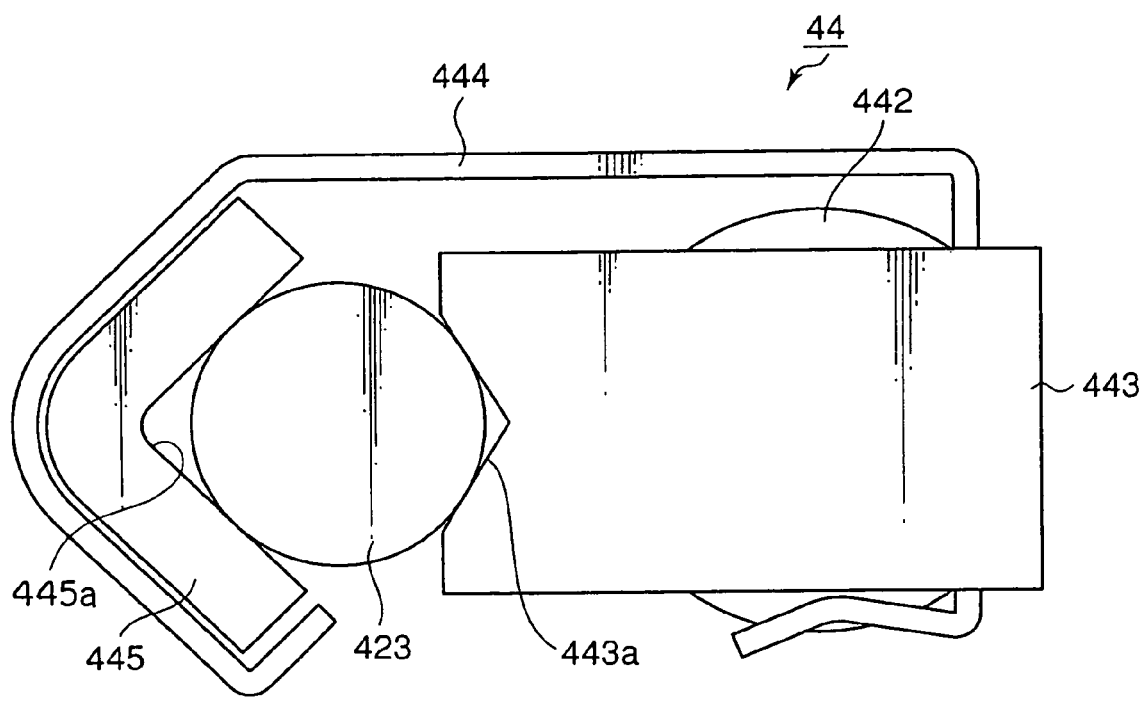
FIG. 3 is a plan view showing the lens driving portion of the driving device illustrated in FIG. 2 together with the rod-shaped moving shaft.
Figure 4:
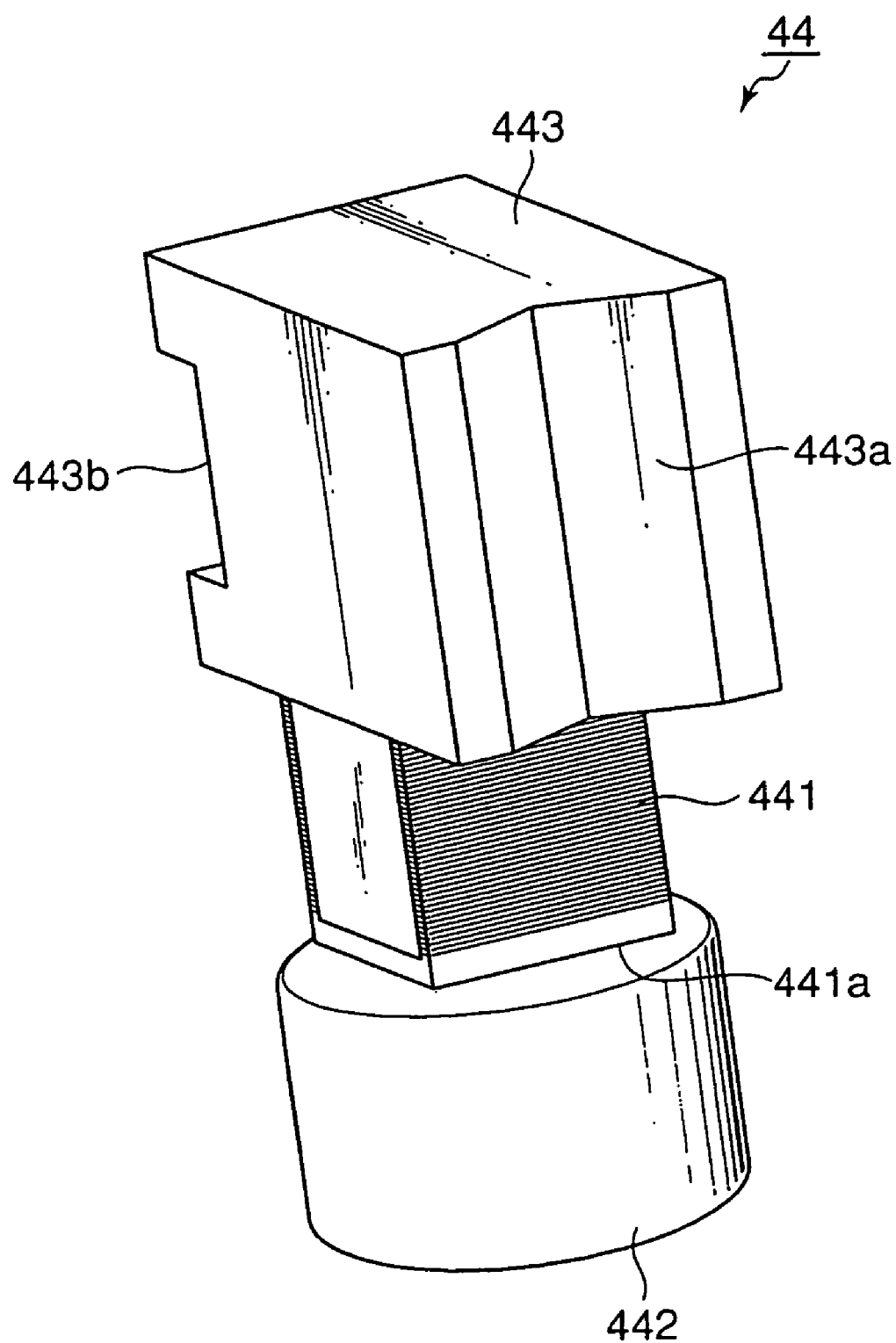
FIG. 4 is a perspective view showing a main portion of the lens driving portion illustrated in FIG. 2.

Referring to FIGS. 2 through 4 in addition to FIG. 1, the description will proceed to the lens driving portion 44 of the auto-focus lens driving unit 40. FIG. 2 is a perspective view showing the lens driving portion 44 of the auto-focus lens driving unit 40 together with the rod-shaped moving shaft 423. FIG. 3 is a plan view showing the lens driving portion 44 of the auto-focus lens driving unit 40 together with the rod-shaped moving shaft 423. FIG. 4 is a perspective view showing a main portion of the lens driving portion 44.

Figure 5:
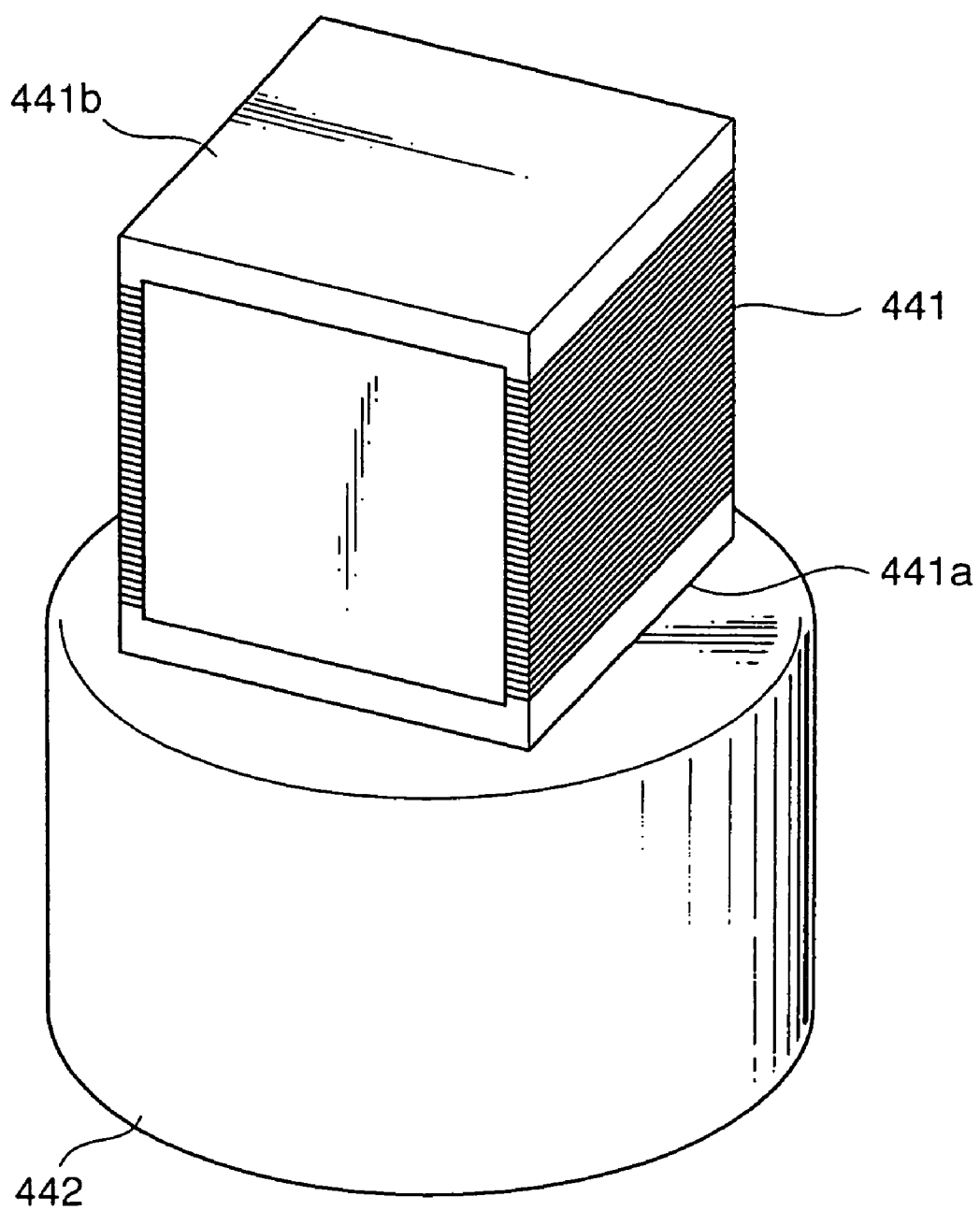
FIG. 5 is a perspective view showing an piezoelectric unit for use in the lens driving portion illustrated in FIG. 2.

The lens driving portion 44 comprises a laminated piezoelectric element 441 serving as an electro-mechanical transducer, the stationary member (the weight) 442, and a vibration friction portion 443. The laminated piezoelectric element 441 expands and contracts in a direction of the optical axis O. The laminated piezoelectric element 441 has a structure where a plurality of piezoelectric layers are laminated in the direction of the optical axis O. As shown in FIG. 5, the laminated piezoelectric element 441 has a first end portion (a lower end portion) 441*a* and a second end portion (an upper end portion) 441*b* which are disposed to each other in the expansion/contraction direction. The stationary member (the weight) 442 is coupled to the first end portion (the lower end portion) 441*a* of the laminated piezoelectric element 441 using an adhesive agent or the like. The vibration friction portion 443 is mounted to the second end portion (the upper end portion) 441*b* of the laminated piezoelectric element 441 using the adhesive agent or the like. Although the vibration friction portion 443 is directly coupled to the second end portion 441*b* of the laminated piezoelectric element 441, any member may be sandwiched between the vibration friction portion 443 and the second end portion 441*b* of the laminated piezoelectric element 441.

In addition, as shown in FIG. 5, a combination of the laminated piezoelectric element 441 and the static member 442 is called an piezoelectric unit.

The rod-shaped moving shaft 423 is frictionally coupled to the vibration friction portion 443. As shown in FIGS. 3 and 4, the vibration friction portion 443 has a groove (a friction engagement surface) 443*a* which is a V-shape in cross section at a friction coupling portion between the vibration friction portion 443 and the rod-shaped moving shaft 423.

The lens driving portion 44 comprises a spring 444 for pressing (urging) the rod-shaped moving shaft 423 against the vibration friction portion 443. That is, the spring 444 serves as an urging arrangement which is fixed to the vibration friction portion 443 and which generates a pressing force for pressing the moving shaft 423. Between the spring 444 and the rod-shaped moving shaft 423, a pad 445 having a V-shaped structure is sandwiched. The pad 445 is disposed so as to be opposed to the vibration friction portion 443 with the moving shaft 423 sandwiched therebetween. In the manner which is similar to the vibration friction portion 443, the pad 445 also has a groove 445*a* which is a V-shape in cross section at a contact portion between the pad 445 and the rod-shaped moving shaft 423. The vibration friction portion 443 has a groove 443*b* for holding the spring 444. The spring 444 has a first end portion which is engaged with the vibration friction portion 443 at the groove 443*b* and a second end portion which extends towards the moving shaft 423. Therefore, the vibration friction portion 443 and the pad 445 are pressed against the rod-shaped moving shaft 423 by the spring 444. As a result the rod-shaped moving shaft 423 is frictionally coupled to the vibration friction portion 443 with stability.

The lens driving portion 44 and the lens moving portion 42 are disposed in parallel with each other in the optical axis O as shown in FIG. 1. Accordingly, it is possible to lower a height of the auto-focus lens driving unit 40. As a result, it is possible to also lower a height of the driving device 20.

Figures 6A, 6B:
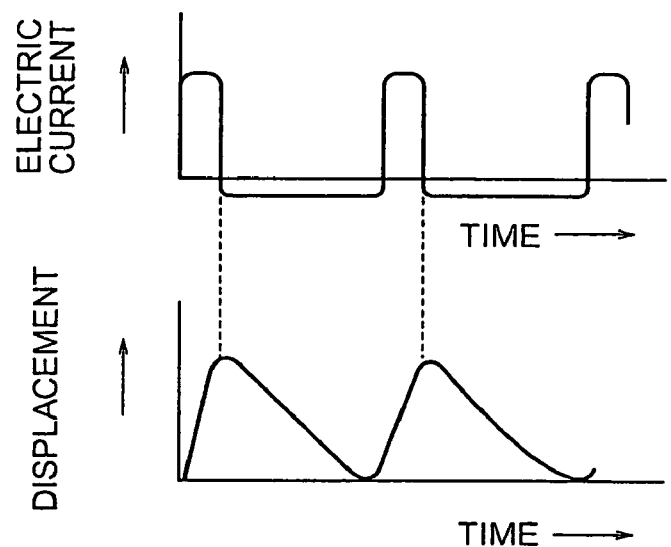
FIG. 6A is a waveform diagram for use in describing a current supplied to a laminated piezoelectric element.
FIG. 6B is a waveform diagram for use in describing displacements generated by the laminated piezoelectric element.

Referring now to FIGS. 6A and 6B, the description will proceed to an electric current supplied to the laminated piezoelectric element 441 and displacements generated in the laminated piezoelectric element 441. FIGS. 6A and 6B are similar to those illustrated in FIG. 5 of the above-mentioned JP-B 3218851 (the second Patent Document) which corresponds to FIGS. 8(*a*) and 8(*b*) of U.S. Pat. No. 5,589,723. FIG. 6A shows a change of the electric current supplied to the laminated piezoelectric element 441 by a driving circuit (not shown) and FIG. 6B shows the displacements of the laminated piezoelectric element 441.

As shown in FIG. 6A, a large current (in a positive or forward direction) and a constant current (in a negative or reverse direction) flow alternately through the laminated piezoelectric element 441. Under the circumstances, the laminated piezoelectric element 441 produces alternately a rapid displacement (expansion) corresponding to the large current (positive or forward) and a slow displacement (contraction) corresponding to the constant current (negative or reverse), as shown in FIG. 6B.

That is, by applying a rectangular current to the laminated piezoelectric element 441 (FIG. 6A), it makes the laminated piezoelectric element 441 produce sawtooth displacements (expansion and contraction) (FIG. 6B).

Referring to FIG. 1 in addition to FIGS. 6A and 6B, the description will be made as regards operation of the auto-focus lens driving unit 40. First, the description will presently be made as regards operation in a case where the lens movable portion 42 moves along the up-and-down direction Z downwards.

It will now be assumed that the large current flows to the laminated piezoelectric element 441 in the positive or forward direction as shown in FIG. 6A. In this event, the laminated piezoelectric element 441 rapidly produces the expansion displacement in the thickness direction as shown in FIG. 6B. As a result, the vibration friction portion 443 rapidly moves along the direction of the optical axis O (the up-and-down direction Z) upwards. In this event, the lens movable portion 42 does not moves. This is because, caused by the inertial force, the lens movable portion 42 substantially remains in its position by overcoming the friction force between the vibration friction portion 443 and the rod-shaped moving shaft 423.

Subsequently, it will be assumed that the constant current flows the laminated piezoelectric element 441 in the negative or reverse direction as shown in FIG. 6A. In this event, the laminated piezoelectric element 441 slowly produces the contraction displacement in the thickness direction as shown in FIG. 6B. As result, the vibration friction portion 443 slowly moves along the direction of the optical axis O (the up-and-down direction Z) downwards. In this event, the lens movable portion 43 substantially moves along the direction of the optical axis O (the up-and-down direction Z) downwards together with the vibration friction portion 443. This is because the vibration friction portion 443 and the rod-shaped moving portion 423 come into surface contact with each other and are coupled to each other due to the friction force generating in the contact surfaces.

In the manner which is described above, by alternately flowing the large current (the positive or forward direction) and the constant current (the negative or reverse direction) through the laminated piezoelectric element 441 to make the laminated piezoelectric element 441 alternately produce the expansion displacement and the contraction displacement, it is possible to continuously move the lens-holder 421 (the lens movable portion 42) along the direction of the optical axis O (the up-and-down direction Z) downwards.

It will be assumed that it makes the lens movable portion 42 along the direction of the optical axis O (the up-and-down direction Z) upwards. Conversely, this is obtained by alternately flowing the large current (the negative or reverse direction) and the constant current (the positive or forward direction) through the laminated piezoelectric element 441.

Now, the description will proceed to the laminated piezoelectric element 441. The laminated piezoelectric element 441 has a rectangular parallelepiped shape having an element size of 0.9 mm×0.9 mm×1.5 mm. The piezoelectric material is made of a material having a low Qm such as lead-zirconate-titanate (PZT). The laminated piezoelectric element 441 is manufactured by alternately laminating the piezoelectric materials each having a thickness of 20 microns and the internal electrodes each having a thickness of 2 microns in a corn fashion by fifty layers. In addition, the laminated piezoelectric element 441 has the effective internal electrode size of 0.6 mm×0.6 mm. In other wards, at a peripheral portion positioned the outside of the effective internal electrode of the laminated piezoelectric element 441, there is a ring-shaped dead area (clearance) of a width of 0.15 mm.

Now, the description will be made as regards materials of the stationary member (the weight) 442 for use in the driving device 20 according to this invention.

In the example being illustrated, the stationary member 442 consists essentially of a base alloy (a tungsten alloy) which consists of, by weight, 97% tungsten (W), 2% nickel (Ni) as a binder, and 1% cobalt (Co) as the balance. In addition, the tungsten alloy (the stationary member) 442 has a surface without being coated with nickel plating.

The following Table 1 shows standard electric potentials (V) of main metals.

TABLE 1

| Standard Electric Potentials of Main Metals (V) | | | | | | |
|---|---|---|---|---|---|---|
| Mg | Ti | Al | Zn | Cr | Fe | Co |
| −2.38 | −1.75 | −1.66 | −0.76 | −0.74 | −0.44 | −0.27 |
| Ni | Mo | Sn | Pb | W | Cu | Ag |
| −0.25 | −0.20 | −0.14 | −0.13 | −0.09 | 0.34 | 0.80 |

In the manner which is apparent from the Table 1, the weight disclosed in the above-mentioned sixth patent document contains copper (Cu) having an ionization tendency which is lower than that of tungsten (W). Accordingly, tungsten (W) itself easily undergoes oxidation and it is necessary to apply a nickel coating for preventing oxidation of tungsten to a surface of a tungsten alloy. As a result, the weight disclosed in the sixth patent document is disadvantageous in that a manufacturing process increases and a piece rate of the weight (the stationary member, the fixed member) is expensive. Oxidation of tungsten (W) results in generating dust and it prevents the moving portion driving. In addition, inasmuch as the dust deposits on the lens and on the image pickup device, the dust becomes a cause of image degradation. Therefore, anti-oxidation measures are absolutely necessary in the sixth patent document, as mentioned in the preamble of the instant specification.

On the other hand, inasmuch as the stationary member (the weight) 442 according to the exemplary embodiment of the invention consists essentially of the tungsten alloy where tungsten (W) is doped with, as the binder, nickel (Ni) having an ionization tendency which is higher than tungsten (W), it is possible to prevent oxidation of tungsten (W) without forming a protective oxidation layer such as nickel plating. In addition, in the exemplary embodiment of the invention, the tungsten alloy of the stationary member (the weight) 442 is doped with cobalt (Co) having an ionization tendency which is higher than that of tungsten (W). In other words, the weight 442 of the exemplary embodiment of the invention is different from the weight disclosed in the sixth patent document and is doped with cobalt (Co) in lieu of copper (Cu).

In addition, although cobalt (Co) is added (used) to the tungsten alloy as a metal having an ionization tendency which is higher than that of tungsten (W) in the exemplary embodiment of the invention, it is seen from Table 1 that the tungsten alloy may be doped (used) with at least one selected from the group consisting of cobalt (Co), titanium (Ti), aluminum (Al), lead (Pb), chromium (Cr), iron (Fe), molybdenum (Mo), and tin (Sn).

In the manner which is described above, nickel plating for providing oxidation of tungsten is not applied to the surface of the tungsten alloy in the weight 442 according to the exemplary embodiment of the invention, a manufacturing process is reduced and it is possible to obtain the stationary member 442 at low prices.

In the exemplary embodiment of this invention, the stationary member 442 has mass which is seven times or more that of vibration friction portion 443. Such a ground will be described as follows.

Figure 7:
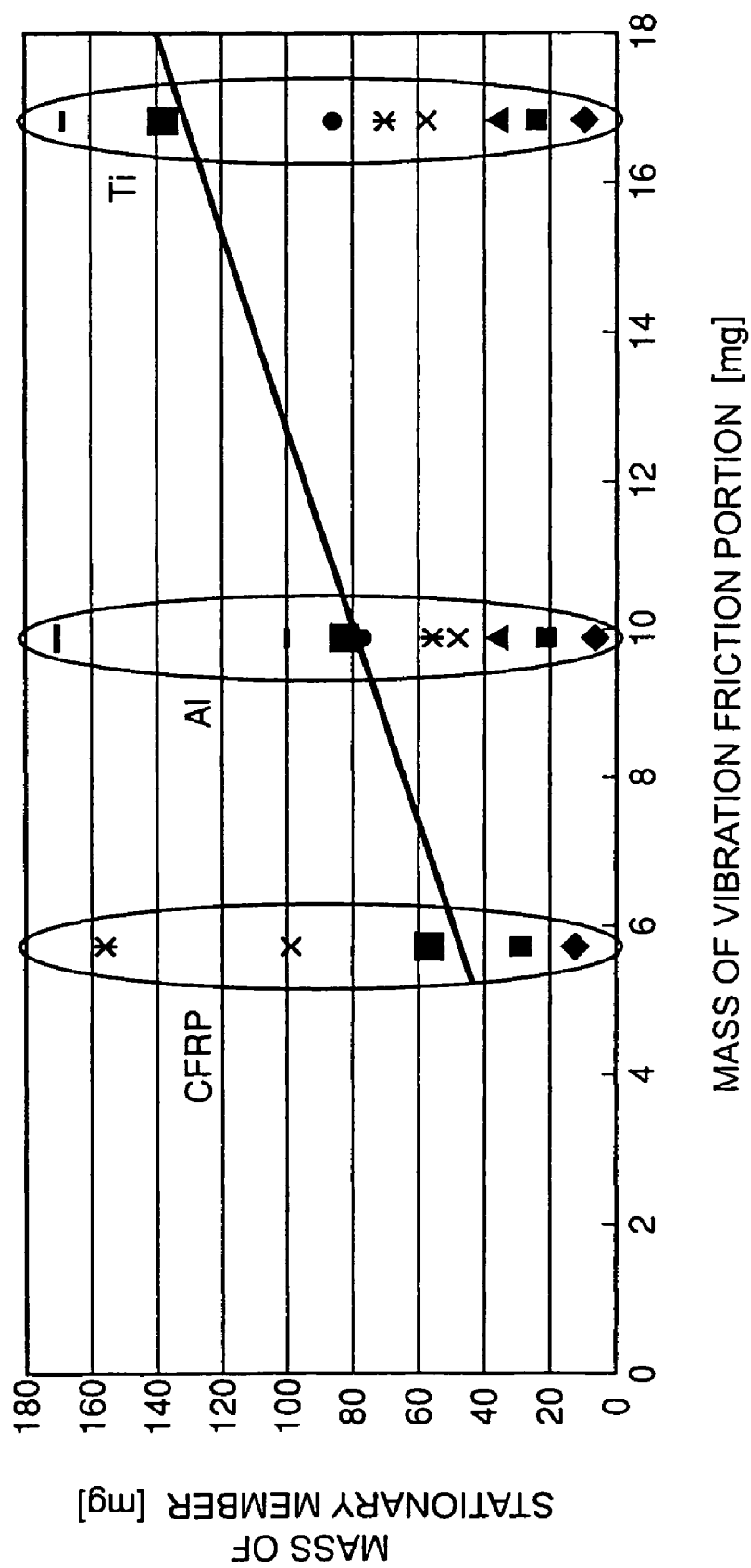
FIG. 7 is a graph where mass of a vibration friction portion and mass of a stationary member are plotted.

FIG. 7 shows a graph where mass of the vibration friction portion 443 and mass of the stationary member are plotted. In FIG. 7, the abscissa represents mass [mg] of the vibration friction portion 443 and the ordinate represents mass [mg] of the stationary member 442. The illustrated example shows an example where tungsten (W) is used as the material of the stationary member 442 and carbon fiber reinforced plastic (CFRP), aluminum (Al), and titanium (Ti) are used as the material of the vibration friction portion 443.

In FIG. 7, large black-coated rectangle marks show mass ratios where the stationary member 442 is put into a stationary state although the laminated piezoelectric element 441 expands and contracts. In addition; a slanting straight line in FIG. 7 shows a straight line where the mass ratio ([mass of the stationary member 442]/[mass of the vibration friction portion 443]) is seven times. Accordingly, it seen that an area which is upper than the slanting straight line in FIG. 7 is an area where the stationary member 442 remains at rest in independence of the material of the vibration friction portion 443. That is, when the above-mentioned mass ratio is seven times or more, it seen that the stationary member 442 is stable and the vibrations (the expansion/contraction movement) of the laminated piezoelectric element 441 efficiently transfers to the vibration friction portion 443.

Although FIG. 7 shows an example where tungsten (W) is used as the material of the stationary member 422, it may be easily seen by those of ordinary skill in the art that similar effect is obtained in a case where the above-mentioned tungsten alloy is used as the material of the stationary member 442. This is because FIG. 7 is a matter of the mass ratios and is irrelevant to the material of the stationary member 442.

Furthermore, in the exemplary embodiment of the invention, the stationary member 442 has a cylindrical shape and the stationary member 442 has a thickness/diameter ratio which is not less than 18%. A reason for setting as such will be described as follows.

The stationary member 442 is required as performance for a suitable weight and structural stability in order to effectively transfer the expansion/contraction of the electro-mechanical transducer (the laminated piezoelectric element) 441 to the vibration friction portion 443. In a case of mounting the driving device 20 on a product required for downsizing such as a camera module, it is necessary to take interference between the driving device 20 and other mechanisms and the cost of the driving device 20 into consideration. Therefore, the co-inventors derived a suitable dimensional ratio (the thickness/the diameter) of the stationary member 442 in simulation in order to obtain more stable behavior of the driving device 20.

The following Table 2 shows resonance frequencies [kHz] and dimensional ratios ((the thickness/the diameter)×100) [%] in a case of changing the diameter [mm] and the thickness [mm] in a state where the material of the stationary member 442 is tungsten (W) and the mass of the stationary member 442 is constant of 57 mg.

TABLE 2

| diameter (mm) | thickness (mm) | resonance frequency (kHz) | dimensional ratio (%) |
|---|---|---|---|
| 1.50 | 1.67 | 301.0 | 111.1 |
| 2.13 | 0.83 | 301.0 | 39.0 |
| 2.25 | 0.74 | 300.2 | 32.9 |
| 2.50 | 0.60 | 295.0 | 24.0 |
| 2.75 | 0.50 | 282.6 | 18.0 |
| 3.01 | 0.41 | 252.0 | 13.8 |
| 3.88 | 0.25 | 114.0 | 6.4 |

*mass of stationary member is constant at 57 mg
*dimensional ratio = (thickness/diameter) × 100

Figure 8:
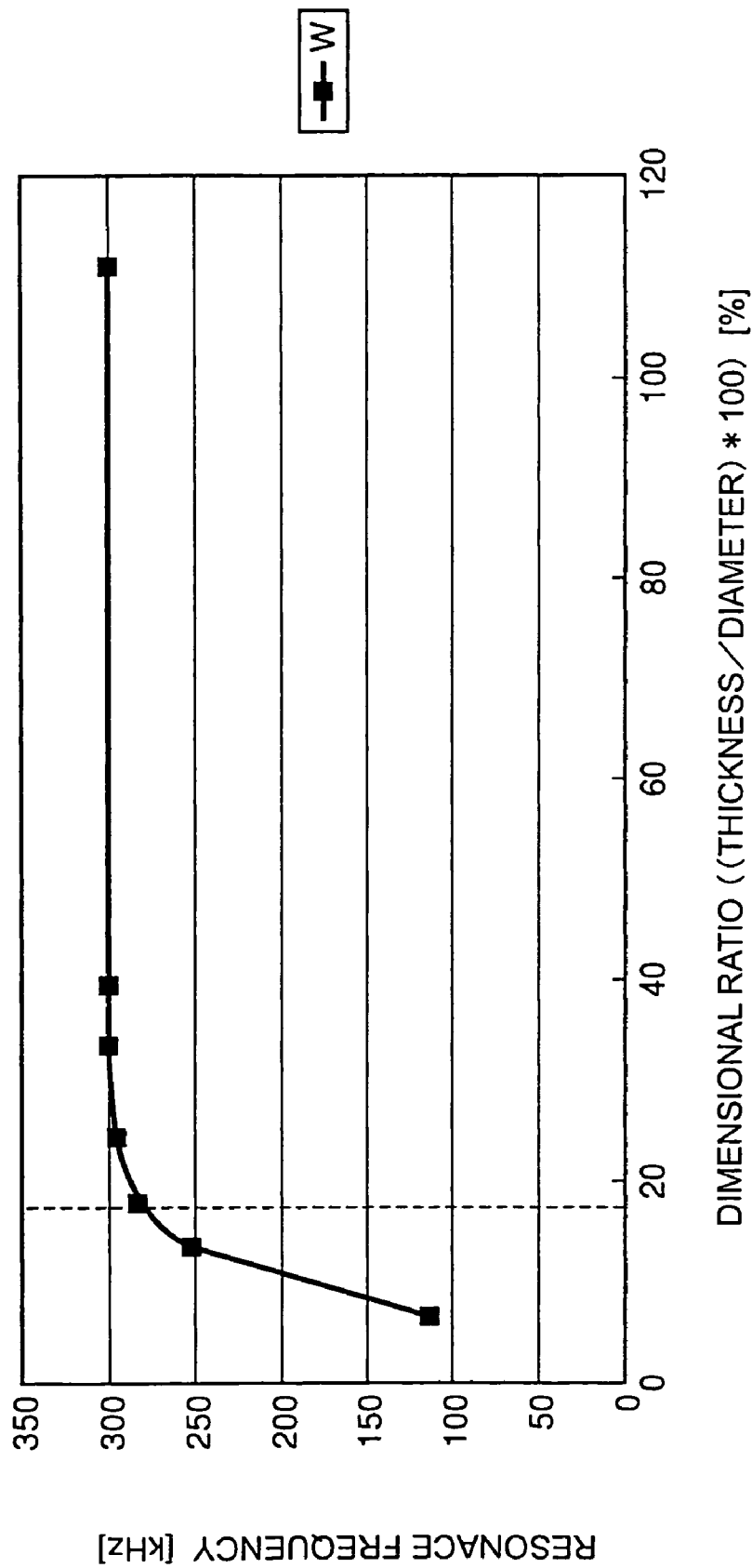
FIG. 8 is a grape of modal analytical results in a case where the stationary member is made of tungsten as a material thereof and the stationary member has mass which is constant of 57 mg.

FIG. 8 is a graph showing modal analytical results. In FIG. 8, the abscissa represents the dimensional ratio ((the thickness/the diameter)×100) [%] and the ordinate represents the resonance frequency [kHz]. That is, FIG. 8 shows a mode resonance frequency characteristic when the dimensional ratio is changed in a case where the mass of the stationary member 422 is constant of 57 mg. In FIG. 8, a dotted line shows a line where the dimensional ratio is equal to 18%.

In the manner as apparent from FIG. 8, it is seen in a area where the dimensional ratio is 18% or more that the resonance frequency is high and variance of the resonance frequency is negligible although the dimensional ratio slightly changes. That is, it can be said that the area where the dimensional ratio is 18% or more is an area where the driving device 20 has stable stiffness. On the other hand, it is seen in an area where the dimensional ratio is less than 18% that the resonance frequency decreases and the resonance frequency changes when the dimensional ratio slightly changes. Accordingly, it cannot be said that the area where the dimensional ratio is less than 18% is an area where the driving device 20 has stable stiffness.

From the abovementioned circumstances, by setting the dimensional ratio for 18% or more, it is seen that the driving device 20 itself has improved stiffness and it is possible to effectively transfer the extension/contraction of the electro-mechanical transducer (the laminated piezoelectric element) 441 to the vibration friction portion 443.

Although Table 2 and FIG. 8 show an example where tungsten (W) is used as the material of the stationary member 442, it may be understood by those of ordinary skill in the art that a similar effect is obtained in a case where the above-mentioned tungsten alloy is used as the material of the stationary member 442. This is because Table 2 and FIG. 7 are a matter of the dimensional ratios and are irrelevant to the material of the stationary member 442.

In the exemplary aspect of this invention, the metal having the ionization tendency which is higher than tungsten may be at least one selected from the group consisting of cobalt, titanium, aluminum, lead, chromium, iron, molybdenum, and tin. It is preferably that the stationary member has mass which is seven times or more that of the vibration friction portion. It is desirable that the stationary member has a cylindrical shape and the stationary member has a thickness-diameter ratio which is not less than 18%.

An exemplary advantage according to the invention is that a manufacturing process is reduced and the stationary member is inexpensive. This is because the tungsten alloy used as the stationary member has a surface without nickel plating for preventing oxidation thereof.

Another exemplary advantage according to the invention is that it is possible to efficiently transfer vibrations of the electro-mechanical transducer to the vibration friction portion because the stationary member has mass which is seven times or more that of the vibration friction portion.

Still another exemplary advantage according to the invention is that it is also possible to efficiently transfer vibrations of the electro-mechanical transducer to the vibration friction portion because the stationary member has a thickness-diameter ratio of 18% or more when the stationary member has a cylindrical shape.

While this invention has been particularly shown and described with reference to exemplary embodiments thereof, the invention is not limited to these embodiments. It will be understood by those of ordinary skill in the art that various changes in form and details may be therein without departing from the spirit and scope of the present invention as defined by the claims.

What is claimed is:

1. A driving device comprising:
   an electro-mechanical transducer having first and second end portions opposite to each other in an expansion/contraction direction;
   a stationary member coupled to the first end portion of said electro-mechanical transducer;
   a vibration friction portion mounted to the second end portion of said electro-mechanical transducer, said vibration friction portion having a V-shaped groove in cross section;
   a rod-shaped moving portion frictionally coupled to said vibration friction portion, said rod-shaped moving portion being movable in the expansion/contraction direction of said electro-mechanical transducer; and
   an urging arrangement, fixed to said vibration friction portion, for urging said rod-shaped moving portion against said vibration friction portion at the V-shaped groove thereof,
   wherein said stationary member consists essentially of a base alloy which consists of, by weight, 88 to 97% tungsten, 2 to 11% nickel as a binder, and, as the balance, 0.1 to 2% of at least one metal having an ionization tendency which is higher than that of tungsten, said stationary member having a surface without nickel plating.

2. The driving device as claimed in claim 1, wherein said metal having the ionization tendency which is higher than tungsten is at least one of cobalt, titanium, aluminum, lead, chromium, iron, molybdenum, and tin.

3. The driving device as claimed in claim 1, wherein said stationary member has a mass which is at least seven times a mass of said vibration friction portion.

4. The driving device as claimed in claim 1, wherein said stationary member has a cylindrical shape and said stationary member has a thickness-diameter ratio which is not less than 18%.

5. A driving device comprising:
   an electro-mechanical transducer having first and second end portions opposite to each other in an expansion/contraction direction;
   a stationary member coupled to the first end portion of said electro-mechanical transducer;
   a vibration friction portion mounted to the second end portion of said electro-mechanical transducer, said vibration friction portion having a V-shaped groove in cross section;
   a rod-shaped moving portion frictionally coupled to said vibration friction portion, said rod-shaped moving portion being movable in the expansion/contraction direction of said electro-mechanical transducer; and an urging arrangement, fixed to said vibration friction portion, for urging said rod-shaped moving portion against said vibration friction portion at the V-shaped groove thereof, wherein said stationary member has a mass which is at least seven times a mass of said vibration friction portion.

6. A driving device comprising:

an electro-mechanical transducer having first and second end portions opposite to each other in an expansion/contraction direction;

a stationary member coupled to the first end portion of said electro-mechanical transducer;

a vibration friction portion mounted to the second end portion of said electro-mechanical transducer, said vibration friction portion having a V-shaped groove in cross section;

a rod-shaped moving portion frictionally coupled to said vibration friction portion, said rod-shaped moving portion being movable in the expansion/contraction direction of said electro-mechanical transducer; and an urging arrangement, fixed to said vibration friction portion, for urging said rod-shaped moving portion against said vibration friction portion at the V-shaped groove thereof, wherein said stationary member has a cylindrical shape and said stationary member has a thickness-diameter ratio which is not less than 18%.

* * * * *